O. G. STORM.
STEAM COOKER.
APPLICATION FILED MAR. 28, 1910.
979,591.
Patented Dec. 27, 1910.
2 SHEETS—SHEET 1.
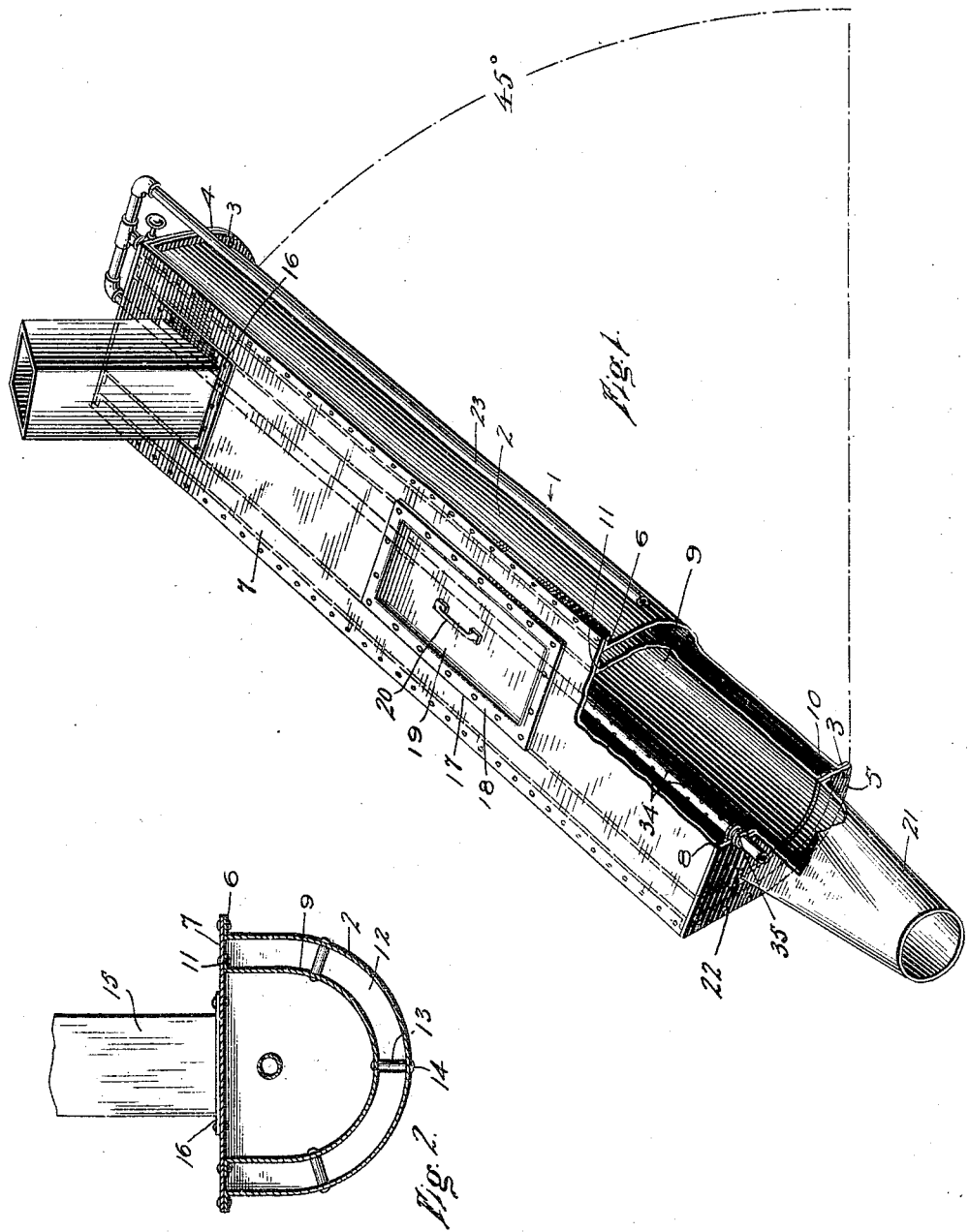
Witnesses
J. S. Freeman
B. F. Fishburne
Inventor
O. G. Storm.
By C. L. Parker, Attorney O. G. STORM.
STEAM COOKER.
APPLICATION FILED MAR. 28, 1910.
979,591.
Patented Dec. 27, 1910.
2 SHEETS—SHEET 2.
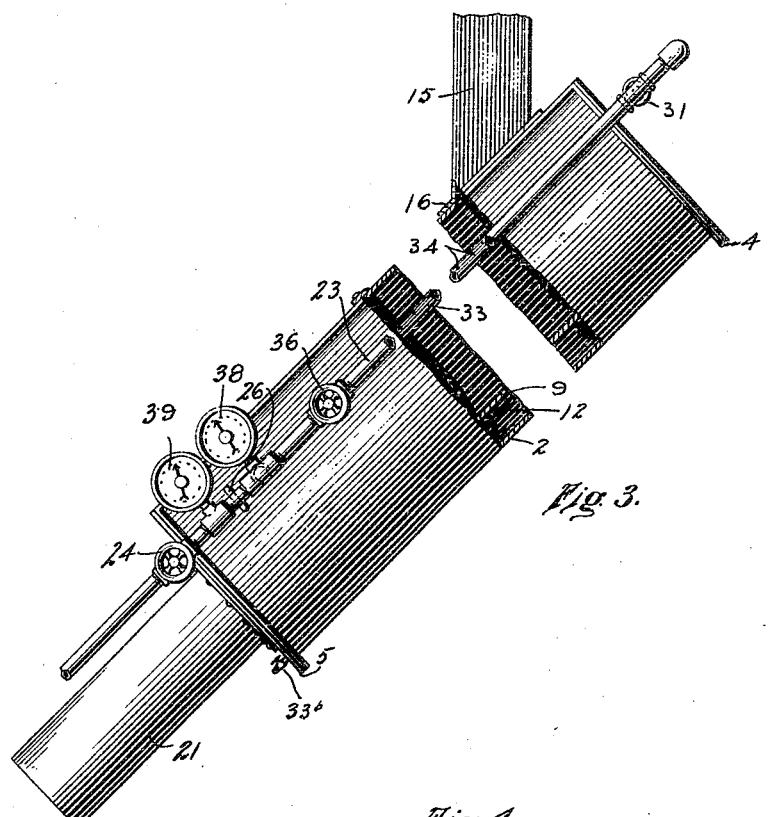
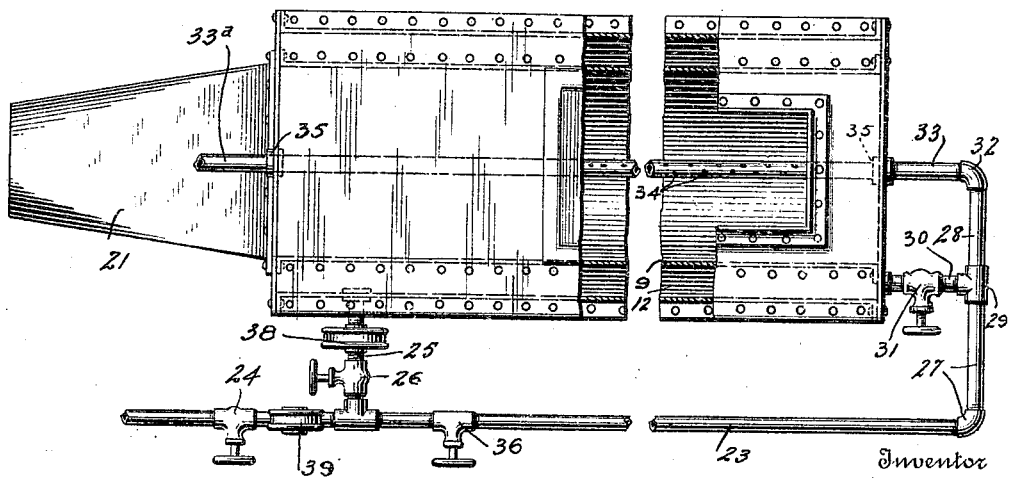
Witnesses
J. S. Freeman
B. H. Fishburne
Inventor
O. G. Storm,
By C. L. Parker, Attorney

UNITED STATES PATENT OFFICE.

ORA G. STORM, OF LONGMONT, COLORADO.

STEAM-COOKER.

979,591. Specification of Letters Patent. Patented Dec. 27, 1910.

Application filed March 28, 1910. Serial No. 552,070.

*To all whom it may concern:*

Be it known that I, ORA G. STORM, a citizen of the United States, residing at Longmont, in the county of Boulder and State of Colorado, have invented certain new and useful Improvements in Steam-Cookers, of which the following is a specification.

My invention relates to grain cookers, and has for one of its objects to provide a device of this character which will render the cooking of grain expeditious and continuous.

A further object of this invention is to provide a steam cooker embodying novel means for supplying steam to the chambers of the same.

The final object of this invention is to provide a device of the above character which will be simple in construction, efficient in practice and economical in manufacture.

In the accompanying drawings forming a part of this specification, and in which like numerals are employed to designate like parts throughout the same, Figure 1 is a perspective view of the cooker, a portion of the same being broken away, and showing the cooker in its operative position. Fig. 2 is a vertical cross section of the cooker. Fig. 3 is a side elevation of the same, parts thereof being broken away. Fig. 4 is a top plan view of the same, parts thereof being broken away.

In the drawings illustrating a preferred embodiment of my invention, the numeral 1 designates as a whole a cooker which is shown as being approximately semi-cylindrical. This cooker comprises an outer semi-cylindrical casing 2, which has outwardly extending flanged ends 3 as shown. The outer casing 2 is preferably formed of sheet metal and has secured to its upper and lower ends respectively heads 4 and 5. These heads 4 and 5 are secured to the flanges 3 by means of bolts or the like and form therewith a steam tight union. The upper or free edges of the outer casing 2 are formed as shown with outwardly extending flanges 6, upon which is bolted or riveted a flat rectangular cover 7, which forms with the flanges 6 a steam tight union. The ends of the cover 7 are preferably bent inwardly to form flanges 8, to which are bolted or otherwise suitably secured the heads 4 and 5, it being understood that these heads form steam tight unions with the cover 7.

Arranged concentrically within the outer casing 2 is a smaller inner approximately semi-cylindrical casing 9, which is preferably formed of sheet metal and provided at its ends with outwardly extending flanges 10 which are bolted or otherwise secured to the heads 4 and 5 to form a steam tight joint with the same. The inner casing 9 is provided upon its free edges with longitudinal outwardly extending flanges 11 which are bolted or otherwise secured to the cover 7 to form steam tight joints with the same. As shown in Fig. 2 there is formed a space 12 between the outer and inner casings 2 and 9, and I will hereinafter refer to this space as a heating chamber. The inner casing 9 is retained in its proper concentric position with relation to the outer casing 2, by means of sleeves 13 which are arranged at suitable intervals between the casings 2 and 9, and to which said casings are clamped by means of bolts 14 which pass through said sleeves 13.

The cover 7 is provided near its upper end with a feed chute 15, which is shown as having a lower flanged end 16 which is bolted to the cover 7 to form a steam tight joint with the same. The cover 7 is further provided near its center with a rectangular opening 17. This rectangular opening is normally closed by means of a lid 19 provided as shown with a suitable handle 20 and a flange 18. This lid is to be constructed to fit snugly within the opening 17 and to form a steam tight joint with the cover 7, it being understood however that the lid 19 may be removed when it is desired to obtain access to within the inner casing 9, which may be termed the cooking chamber. The lower head 5 is provided with a discharge chute 21, which has its upper end flanged as at 22 and bolted or otherwise secured to the head 5 as shown to form therewith a steam tight joint. By reference to Fig. 1 it will be seen that the chute 21 has communication with the cooking chamber while the same does not communicate with the heating chamber.

A pipe 23 is arranged at one side of the cooker 1 as shown, and this pipe 23 is controlled by means of a valve 24. The pipe 23 communicates with the lower end of the heating chamber 12 by means of a branch pipe 25 as shown, which is in turn suitably connected to said pipe 23 and the outer casing 2. This branch pipe is controlled by means of a valve 26. The pipe 23 is provided at its upper end with an elbow 27, which unites the pipe 23 with a transverse pipe 28 as shown. This transverse pipe is provided near its center with a T-joint 29 which engages as shown a branch pipe 30 which has communication with the heating chamber 12 and is connected to the head 4 by any suitable means. The branch pipe 30 is controlled by means of a suitable valve as shown at 31. The inner end of the transverse pipe 28 is connected by means of an elbow joint 32 to a discharge pipe 33, which passes through the heads 4 and 5 of the cooker as shown, and is provided with a plurality of apertures 34. This discharge pipe is arranged longitudinally within the inner casing or cooking chamber and is adapted to discharge steam within the same for a purpose to be hereinafter explained. As shown in Fig. 1 the discharge pipe 33 is provided adjacent the head 5 with clamping rings 35, which securely clamp the discharge pipe to said head and form a steam tight joint. The same construction is employed for clamping the pipe 33 to the head 4. The pipe 23 is provided with a valve 36 for a purpose to be hereinafter explained.

Arranged upon the branch pipe 25 and having communication therewith is a pressure gage 38, for the purpose of showing the pressure maintained within the heating chamber 12. Arranged upon the pipe 23 and having communication therewith is a pressure gage 39, which is to be employed to show the pressure within the cooking chamber.

In the operation of the cooker the same is preferably arranged at an angle of 45 degrees as illustrated in Fig. 1, and grain is fed into the cooking chamber or in the casing 9 through the chute 15. Steam is then allowed to pass through valves 24 and 26 into the heating chamber 12. Either of the valves 36 or 31 may be opened which will permit steam to flow into the discharge pipe 33 and then through openings 34 into the cooking chamber, where the same will come in contact with the grain. The grain gravitates downwardly within the casing 9 and after being cooked is discharged through the chute 21. If it is found that the steam keeps the grain too damp, the valves 36 and 31 may be closed and all the steam will then be discharged into the heating chamber, whereby the grain is subjected to a dry heat without coming in contact with the steam. If it should be found that the grain within the cooking chamber is being dried too much by the steam within the heating chamber, the operator by closing the valves 26 and 31 and opening the valve 36, can conduct all the steam into the cooking chamber. When the valves 31 and 36 are closed and all of the steam is being discharged into the heating chamber 12, the gage 38 will indicate the pressure in said heating chamber. When the valves 26 and 31 are closed and valve 36 opened so that all of the steam is being fed into the cooking chamber, the gage 39 will show the pressure within this cooking chamber.

It is to be understood that any suitable means may be employed to supply and regulate the amount of grain fed into the cooking chamber through chute 15. It is also to be understood that steam is to be supplied to the pipe 23 from any suitable form of boiler (not shown) and that the portion 33$^a$ of pipe 33 may return a portion of the steam after use to said boiler. If some of the steam should be condensed to water within the heating chamber, such water may be withdrawn through the drip-valve 33$^b$, shown in Fig. 3.

It is to be understood that the cooker 1 as a whole is to be constructed so that the same will be able to stand boiler pressure.

Having fully described my invention, I claim:

1. A cooker of the character described, comprising an inclined outer casing substantially U-shaped in cross section, an inner casing substantially U-shaped in cross section disposed within the outer casing and spaced therefrom, a common cover connected with the outer and inner casings, supply and discharge means for the inner casing arranged near the upper and lower ends thereof respectively, a steam supply pipe, a plurality of connections between said pipe and the outer casing, valves to control such connections, a perforated pipe disposed axially within the inner casing and connected with the steam supply pipe, and a valve connected with the steam supply pipe to control the passage of steam into the perforated pipe.

2. In a cooker of the character described, an outer casing substantially U-shaped in cross section and having its free edges bent to form flanges, a second casing substantially U-shaped in cross section disposed within the outer casing and having its free upper edges bent to form flanges, said casing having an inclined position, a flat cover disposed upon the flanges of said casings and connected therewith, means to feed material within the upper end of the second named casing, means to allow the discharge of the material from the lower end of the second named casing, means for independently supplying steam within the outer casing and the second named casing, and means to supply steam within the second named casing after such steam has passed through the outer casing.

3. In a cooker of the character described, inner and outer inclined casings, supply and discharge means for the inner casing near its upper and lower ends respectively, a steam supply pipe, a pipe establishing communication between the steam supply pipe and the lower portion of the outer casing, controlling valves connected with the steam supply pipe upon both sides of the second named pipe, a valve connected with the second named pipe to control the same, a third pipe establishing communication between the steam supply pipe and the upper end of the outer casing, a controlling valve connected with the third pipe, and a perforated pipe extending axially within the inner casing and having communication with the steam supply pipe.

In testimony whereof I affix my signature in presence of two witnesses.

ORA G. STORM.

Witnesses:
J. E. BUMP,
F. R. STORM.